(12) United States Patent
Choi et al.

(10) Patent No.: US 6,525,109 B2
(45) Date of Patent: Feb. 25, 2003

(54) PROCESS OF PREPARING POLYCARBONATES USING MICROWAVE

(75) Inventors: Kil-Yeong Choi, Daejeon (KR); Jae Heung Lee, Daejeon (KR); Young Chan Ko, Seoul (KR); Il Seok Choi, Kyunggi-do (KR); Cheol-Hyun Kim, Ulsan (KR); Kwang Soo Yoon, Kyungsangnam-do (KR); Kyong Soon Lee, Seoul (KR)

(73) Assignees: Korea Research Institute of Chemical Technology, Daejeon (KR); S-Oil Corporation, Seoul (KR)

( * ) Notice: Subject to any disclaimer, the term of this patent is extended or adjusted under 35 U.S.C. 154(b) by 18 days.

(21) Appl. No.: 09/903,602

(22) Filed: Jul. 13, 2001

(65) Prior Publication Data

US 2002/0022675 A1 Feb. 21, 2002

(30) Foreign Application Priority Data

Jul. 14, 2000 (KR) .......................... 2000-40666

(51) Int. Cl.$^7$ .............................. C08F 2/46; C08G 64/00
(52) U.S. Cl. ................... 522/183; 522/178; 522/162; 522/163; 522/1; 528/196; 528/198
(58) Field of Search ................ 522/162, 163, 522/1, 178, 183; 528/196, 198

(56) References Cited

U.S. PATENT DOCUMENTS

| | | | | |
|---|---|---|---|---|
| 4,948,871 A | * | 8/1990 | Fukuoka et al. ............. 528/125 |
| 5,024,377 A | * | 6/1991 | Harrison ................ 237/12.3 B |
| 5,191,001 A | * | 3/1993 | Kuhlig et al. ................ 524/125 |
| 5,214,073 A | * | 5/1993 | Fukawa et al. ............. 521/180 |
| 5,225,526 A | * | 7/1993 | Fukawa et al. ............. 524/119 |
| 5,266,659 A | | 11/1993 | Sivaram et al. ............. 525/463 |
| 5,717,056 A | | 2/1998 | Varadarajan et al. ........ 528/196 |
| 5,864,006 A | * | 1/1999 | Ormand et al. ............. 528/196 |
| 6,232,432 B1 | * | 5/2001 | Choi et al. .................. 528/196 |
| 6,316,518 B1 | * | 11/2001 | Phipps et al. ............... 522/104 |
| 6,339,138 B1 | * | 1/2002 | van Hout et al. ........... 528/196 |

FOREIGN PATENT DOCUMENTS

| | | | |
|---|---|---|---|
| EP | 0403657 B1 | * | 1/1998 |
| JP | 05-310907 A | * | 11/1993 |

OTHER PUBLICATIONS

Mallon et al, Enhancement of Solid–State Polymerization with Microwave Energy, J. of Applied Polymer Science, vol. 69, 1203–1212 (1998).*

K. Varadarajan et al., "*Effects of Thermal History, Crystallinity, and Solvent on the Transitions and Relaxations in Poly (bisphenol–A carbonate)*", Journal of Polymer Science Physics Edition, vol. 20, pp. 141–154 (1982).

* cited by examiner

*Primary Examiner*—James J. Seidleck
*Assistant Examiner*—Sanzal McClendon
(74) *Attorney, Agent, or Firm*—Finnegan, Henderson, Farabow, Garrett & Dunner, L.L.P.

(57) ABSTRACT

The present invention relates to a process of preparing polycarbonate, more specifically to a process of preparing polycarbonates by solid state polymerization using microwave radiation, which comprises steps of preparing polycarbonate prepolymer having a certain range of viscosity average molecular weight; converting said polycarbonate prepolymer into crystalline particles having a certain degree of crystallinity; and producing polycarbonates by solid state polymerization of said crystalline particles by applying microwave radiation, thus resulting in production of high quality polycarbonates with high molecular weight within short time.

10 Claims, No Drawings

PROCESS OF PREPARING POLYCARBONATES USING MICROWAVE

BACKGROUND OF THE INVENTION

1. Field of the Invention

The present invention relates to a process of preparing polycarbonates, more specifically to a process of preparing polycarbonates by solid state polymerization using microwave radiation, which comprises steps of preparing polycarbonate prepolymer having a certain range of viscosity average molecular weight; converting said polycarbonate prepolymer into crystalline particles having a certain degree of crystallinity; and producing polycarbonates by solid state polymerization of said crystalline particles by applying microwave radiation. In particular, the use of microwave radiation during solid state polymerization enables to maintain the internal temperature of a reactor uniformly by using the heat produced from the reactants themselves. Consequently, it also drastically reduces melt adhesion among polycarbonate prepolymer particles during solid state polymerization, thus resulting in the production of high quality polycarbonates.

2. Description of the Prior Art

Polycarbonates are known to have excellent properties in terms of transparency, impact resistance, mechanical strength and heat resistance, and thus have been widely used in industry in manufacturing transparent sheets, packaging materials, vehicle bumpers, compact discs and the like.

There are generally three different methods in preparing polycarbonates: interfacial polymerization method, melt polymerization method, and solid state polymerization method. In an interfacial polymerization method, polycarbonates are produced by vigorous mixing aqueous bisphenol A(BPA) solution substituted with sodium with a phosgene-containing organic solution. However, this method has not been shown very advantageous in that the phosgene used as a starting material is an extremely toxic gas. In addition, the solvent being used in the polymerization reaction is volatile chlorine containing organic solvent, so that it can pollute the air as well as the working environment. Furthermore, the polycarbonate obtained according to this method shall contain the salts produced during polymerization and remaining un-reacted reactants, which should be washed off with excessive amount of water. After washing, it should be dried again. However, it has been commercially widely used because it has an advantage to produce products having various characters and clear color.

A melt polymerization method, which produces polycarbonates by direct polymerization of starting materials in melt state under vacuum without using any solvents, has been introduced to solve the above problems. In this method, it is quite necessary to remove phenol, a reaction by-product of the polymerization reaction, in order to increase the molecular weight of polycarbonates being produced. However, the viscosity of reaction mixtures also drastically increases and the removal of phenol becomes more difficult as the melt polymerization goes on. Therefore, this method requires a powerful vacuum system sufficient to get rid of phenol from highly viscous reaction mixtures and a facility to stir the viscous reaction mixtures. And further, color of the product becomes deteriorated due to high reaction temperature. Solid state polymerization is a method designed to produce polycarbonates of high molecular weight having high purity and excellent color by polymerizing at reaction temperature below the melting point in solid states, comprising the formation of polycarbonate prepolymers having relatively low molecular weight, converting them into solid particles, and finally producing polycarbonates via solid polymerization (U.S. Pat. Nos. 5,266,659 and 5,717,056).

The solid state polymerization method performs a polymerization by supplying the heat required for the reaction from external sources by electric heater, a heat carrier, or a heating gas. However, these conventional solid state polymerization methods do not seem to deliver the desired heat uniformly enough into the reactor to maintain uniform reaction temperature distribution throughout reaction medium and thus result in either melt adhesion of polycarbonate prepolymer particles due to local overheating or insufficient polymerization rate due to locally reduced reaction temperature. These local melt adhesion and low temperature eventually make unable to obtain high quality polycarbonates.

Consequently, a new method of preparing polycarbonates is highly required in order to produce high quality polycarbonates with high molecular weight that can control the internal temperature of a reactor well and also increase the polymerization rate as compared to that of a conventional solid state polymerization methods of external heating.

SUMMARY OF THE INVENTION

To solve aforementioned problems of the conventional methods of preparing polycarbonates, the present invention was completed by taking preparation steps comprising a) preparing polycarbonate prepolymers having a viscosity average molecular weight of 4,000–18,000 g/mole through conventional interfacial polymerization of dihydroxyaryl compounds and phosgene or melt polymerization of dihydroxyaryl compounds and diarylcarbonates; b) converting said polycarbonate prepolymers into crystalline particles having 5–50% of crystallinity; and c) producing polycarbonates by solid state polymerization of said crystalline particles by applying microwave radiation for heat generation during said solid state polymerization reaction, thus resulting in production of high quality polycarbonates with high molecular weight and high purity within a short period of time.

Consequently, the object of this invention is to provide a method of preparing polycarbonates by solid state polymerization of polycarbonate prepolymers having desired viscosity average molecular weight and crystallinity using microwave radiation instead of external heat sources, which not only expedites the rate of solid state polymerization but also simplifies the process directed to the production of polycarbonates with high quality.

DETAILED DESCRIPTION OF THE PREFERRED EMBODIMENTS

The present invention relates to preparing polycarbonates by solid state polymerization comprising the following steps:

a) preparing polycarbonate prepolymers having a viscosity average molecular weight of 4,000–18,000 g/mole of through conventional interfacial polymerization of dihydroxyaryl compounds and phosgene or melt polymerization of dihydroxyaryl compounds and diarylcarbonates;

b) converting said polycarbonate prepolymers into crystalline particles having 5–50% of crystallinity; and c) producing polycarbonates by solid state polymerization of said crystalline particles by using microwave radiation.

The detailed description of the present invention is given hereunder.

The present invention relates to a process of preparing polycarbonates having high molecular weights by using microwave radiation wherein the solid state polymerization is conducted not by supplying heat from the external sources but by the heat generated from the inside of polycarbonate prepolymer particles, thus enabling to simplify the polymerization process, controlling the reaction temperature easy, reducing the melt adhesion of polycarbonate prepolymer particles, and increasing the polymerization rate.

The more-detailed description of the present method of preparing polycarbonates is given hereunder.

The first step is to prepare polycarbonate prepolymers having a viscosity average molecular weight of 4,000–18,000 g/mole by performing the interfacial polymerization method, wherein polycarbonate prepolymers are produced by vigorous mixing aqueous bisphenol A(BPA) solution substituted with sodium with a phosgene-containing organic solution or by the melt polymerization, wherein polycarbonate prepolymers are produced by melting dihydroxyaryl compounds and diarylcarbonates at 160–180° C., reacting at an increased temperature of 200–280° C. under atmospheric pressure, and further reacting at vacuum pressure below 1 torr.

The typical reaction conditions for preparing said polycarbonate prepolymers are same as those of conventional interfacial polymerization and melt polymerization for polycarbonate polymers. In conducting the melt polymerization for the preparation of polycarbonate prepolymers, the molar ratio of diarylcarbonates, expressed in the following formula (2), to dihydroxyaryl compounds, expressed in the following formula (1), is 1–1.3.

$$HO-Ar_1-Z-Ar_2-OH \quad (1)$$

In the above formula (1), $Ar_1$ and $Ar_2$ represent the same or different phenyl group or its derivatives; and Z represents a single bond or —O—, —CO—, —S—, —SO$_2$—, —SO—, —CON($R_1$)— or —C($R_2R_3$)— linkage; $R_1$, $R_2$ and $R_3$ represents H or —(CH$_2$)$_n$CH$_3$ respectively; and n is an integer in the range of 0–4.

$$Ar_3-O-C(=O)-O-Ar_4 \quad (2)$$

In the above formula (2), $Ar_3$ and $Ar_4$ represent the same or different phenyl groups or its derivatives.

In the melt polymerization, the molar ratio of diarylcarbonates to dihydroxyaryl compounds is related with the molar ratio of phenyl end groups to hydroxyl end groups, both of which are located at the end of polycarbonate prepolymers after melt polymerization. If the molar ratio of diarylcarbonate to dihydroxyaryl compounds is smaller than 1, it results in color deterioration of the resulting polycarbonate prepolymers due to the presence of excessive amount of unstable terminal hydroxyl groups in the resulting polycarbonate prepolymers. If it exceeds 1.3, however, it becomes difficult for the polycarbonate prepolymers to increase their molecular weights during solid state polymerization reaction due to the presence of excessive amount of terminal phenyl end groups in the resulting polycarbonate prepolymers.

In conducting the interfacial polymerization, the molar ratio of phosgene to diarylcarbonates of formula (2) is 1–1.5. The molar ratio of phenyl end groups to hydroxyl end groups in polycarbonate polymers can be controlled by using compounds as shown in chemical formula (3) having only one hydroxy group.

$$R-Ar_5-OH \quad (3)$$

In the above formula (3), R represents H or an alkyl group having $C_1$–$C_8$; and $Ar_5$ represents phenyl or its derivatives. Phenol or its derivatives can be used for this purpose.

Polycarbonate prepolymers for the solid state polymerization in the present invention are preferred to have viscosity average molecular weight 4,000–18,000 g/mole and the molar ratio of terminal phenyl/hydroxyl (—Ph/—OH) of range from 90/10 to 10/90, from 70/30 to 30/70 more preferably. If the viscosity average molecular weight of the prepared polycarbonate prepolymers is lower than 4,000 g/mole, the prepolymer particles become so minute that melt adhesion can easily occur during the solid state polymerization and also they may be easily sucked out by gas or vacuum. If the viscosity average molecular weight of the prepared polycarbonate prepolymers is greater than 18,000 g/mole, it becomes difficult to convert them into small crystalline particles.

In solid state polymerization, the terminal phenyl and hydroxyl groups of the polycarbonate prepolymers react with each other to increase the molecular weight of polycarbonate and generate phenol as a by-product. If the molar ratio of terminal phenyl/hydroxyl groups is off the range, the molecular weight of polycarbonate prepolymers does not increase well.

The second step is to impart crystallinity in a predetermined range to the above-prepared polycarbonate prepolymers. The methods for preparing crystalline particles are (i) precipitation of polycarbonate prepolymers by pouring molten polycarbonate into a non-solvent and (ii) treatment of crushed polycarbonate prepolymers particles having a size ranging from 10 μm to 5 mm in a non-solvent with vigorous mixing. The size of the resulting crystalline prepolymer particles affects not only the magnitude of total surface area but also the distance that phenol, a by-product in solid state polymerization, is diffused to the surface. If the particle size is too small, a melt adhesion among prepolymer particles will occur during solid state polymerization. If the particle size is too big, on the other hand, the surface area is decreased and the phenol is not easy to diffuse out to the surface, thus resulting in the decrease of the rate of polymerization in the solid state polymerization, eventually not enabling to attain the increase in molecular weight of thus obtained polycarbonate prepolymers.

For easy handling and reduced adhesion, prepared crystalline polycarbonate particles can be agglomerated to make bigger porous pellets by pressing.

In performing solid state polymerization, polycarbonate prepolymers are converted into polymers in solid state and the solid state polymerization is generally performed at a temperature a little lower than the melting temperature ($T_m$).

However, because polycarbonate prepolymers are usually non-crystalline materials and have no definite melting point, they have fluidity and tend to fuse each other at the solid state polymerization temperature. To solve this matter, pretreatment to impart polycarbonate prepolymers have an appropriate degree of crystallinity before solid state polymerization is recommended. Therefore, it is very important for the polycarbonate prepolymers to have a proper degree of crystallinity and thus the inventors of the present invention used polycarbonate prepolymers having a crystallinity of 5–50%. If the crystallinity of polycarbonate prepolymers is below 5%, there would occur a melt adhesion of polycarbonate prepolymer particles during the solid state polymerization, thus making it difficult to remove phenol and eventually unabling to obtain high molecular weight polycarbonates as well as impeding continuation of the solid state polymerization. In contrast, if crystallinity of polycarbonate prepolymers is higher than 50%, the rate of solid state polymerization becomes slow due to a decrease in the amorphous parts of polycarbonate prepolymers wherein the desired polymerizations would occur.

There are several methods to impart crystallinity to polycarbonate prepolymers such as 1) a method to crush polycarbonate prepolymers into particles and crystallize by vigorous stirring them in a non-solvent, 2) a method to precipitate polycarbonate prepolymers by pouring molten polycarbonate prepolymer into a non-solvent directly, 3) a method to add polycarbonate solution into a non-solvent or lower the temperature of a polycarbonate prepolymer solution, and 4) a method to crystallize by add shear force to molten polycarbonate prepolymer.

The degree of crystallinity of polycarbonate prepolymer particles can be controlled by simultaneously adjusting one or more of the factors involved in the crystallization process; the kinds and amount of non-solvents, particle size, temperature of crystallization, and magnitude of shear force. Especially, when the crystallization is performed in a non-solvent environment in particular, crystalline polycarbonate prepolymer particles with relatively large surface area and many pores are obtained. This porosity is very beneficial in removing phenol, a by-product of the solid state polymerization.

The final step of the present invention is to prepare polycarbonates having high molecular weight by performing solid state polymerization by applying microwave radiation in the range of about 900 MHz to 2.45 GHz to the above crystalline prepolymer particles.

When microwave radiation is applied to the above crystalline polycarbonate prepolymer particles, the polar moiety of the crystalline polycarbonate prepolymer particles synchronizes with the microwave and generate heat thus increasing the overall temperature of polycarbonate prepolymer particles. The solid state polymerization is conducted for 1–72 hrs while maintaining the intensity of the microwave applied so that the internal temperature of solid state polymerization reactor can be maintained at 180–250° C. The solid state polymerization can be generally performed at most temperature conditions without particular limitations as long as the solid state polymerization can be proceeded at a relatively acceptable rate and the crystalline prepolymer particles can be maintained in solid state.

However, if the reaction temperature goes above 250° C., crystalline polycarbonate prepolymer particles would undergo a melt adhesion and it is difficult to obtain polycarbonate polymer of high molecular weight and high quality. If the reaction temperature goes below 180° C., the solid state polymerization reaction rate becomes too poor. Therefore, it is important to maintain the solid state polymerization reaction temperature within a preferable range from 180° C. to 250° C.

As an optional way to remove phenol more effectively, such methods as inert gas sweeping through solid state polymerization reactor or vacuum application may be used while applying microwave radiation for heat generation. Especially, the phenol removal can be performed more effectively when inert gas sweeping is used while vacuum is maintained. The inert gas that can be used in the present invention can be a single gas or a mixture of gases selected from the group consisting of a nitrogen gas, a helium gas, and an argon gas. When vacuum is applied along with microwave radiation, it is preferred to maintain the vacuum of range from 3 torr to 700 torr, and from 10 torr to 300 torr more preferably.

However, if the vacuum goes below 3 torr, plasma flame occurs and the solid state polymerization cannot be performed well.

The polycarbonates prepared in the present invention have viscosity average molecular weights of 12,000–100,000 g/mole, which are much larger than those obtained by using the conventional solid state polymerization method within a short period of time.

Especially, the present invention could resolve the problems of conventional solid state polymerization such as melt adhesions and low polymerization rate by utilizing the heat generated from the inside of the polycarbonate prepolymer particles and removing phenol by optionally introducing either inert gas flow or vacuum during the solid state polymerization.

The following examples are intended to be illustrative of the present invention and should not be construed as limiting the scope of this invention defined by the appended claims.

The viscosity average molecular weights ($M_v$) of polycarbonate prepolymers and polycarbonates were estimated by using the following Equation 1, based on the intrinsic viscosity ($[\eta]$) of polycarbonate solution measured at 25° C. using a chloroform as a solvent. The molar ratio of terminal end groups in polycarbonate prepolymers, that is —Ph/—OH, was measured by means of hydrogen nuclear magnetic resonance ($^1$H—NMR) method.

$$[\eta]=KM_v^a \qquad \text{Equation 1}$$

wherein, K=0.012 cm$^3$/g; and a=0.82.

EXAMPLE 1

Solid State Polymerization Using Microwave Under 60 Torr Vacuum (a) Step 1

1.0 kg of a mixture consisting of bisphenol A (BPA) and diphenylcarbonate (DPC) mixed in the molar ratio of 1:1.06 was placed in a 2 L resin kettle kept at room temperature equipped with a stirrer, a nitrogen gas inlet, a reflux, a condenser, and a vacuum pump. After eliminating moisture and oxygen by alternatively applying vacuum and a nitrogen gas three times respectively, kettle was inserted into an oil bath kept and gradually raised the temperature to 160° C. for over 30 min while flowing a nitrogen gas into the reactor at the rate of 0.2 L/min.

Then, the internal temperature of the reactor was raised to 240° C. for over 1 hr and the mixture was allowed to react for 2 hrs. After that, the reactor pressure was reduced to 200 torr by using a vacuum pump and the reaction continued for 1 hr. The reactor pressure was further reduced to 0.2 torr and reacted for 50 min. Thus prepared polycarbonate prepolymer had the viscosity average molecular weight of 10,500 g/mole, and the molar ratio of end groups Ph/OH in prepared polycarbonate prepolymer was 55/45.

(b) Step 2

The polycarbonate prepolymer prepared in the above step 1 was crushed into small particles of sizes less than 710 μm for their crystallization. 100 g of the resulting prepolymer particles were added into a beaker filled with 500 mL acetone and then stirred at 1,000 rpm for 1 hr. Then, the prepolymer particles were filtered and dried at room temperature for 12 hrs. The crystallinity(%) of crystallized prepolymer particle was estimated by measuring the heat of melting peak by DSC(Differential Scanning Calorimetry) and comparing it with the reference data, which is the heat of melting (134 J/g) for 100% crystalline polycarbonate reported in the references (K. Varadarajan et al., *J. of Polymer Science Physics Ed.* Vol 20, p 141–154, 1982). The estimated crystallinity of crystallized polycarbonate particles was 2–1%.

(c) Step 3

30 g of the polycarbonate prepolymer particles prepared in the above step 2 was added into a 250 mL Erlenmeyer flask wherein a porous plate is attached to its lower part for gas injection. After installation of a thermometer and a stirrer, and a vacuum line, the flask was placed in a microwave oven which generates the microwave radiation of frequency 2.45 GHz. The heat capacity of the microwave oven was 1,000 watts. The vacuum was applied to maintain the reactor pressure as vacuum of 60 torr while prepolymer particles were stirred at 20 rpm and nitrogen gas was injected at the rate of about 0.2 L/min. Then, the reactor temperature was raised from room temperature to 220° C. for more than 15 min by applying microwave. And the solid state polymerization was performed for 2 hrs under the same condition. The viscosity average molecular weight of prepared polycarbonate was 26,500 g/mole, and the appearance of said polycarbonate was colorless and transparent.

EXAMPLE 2

Solid State Polymerization Using Microwave Under 760 Torr Vacuum 5 g of crystalline prepolymer particles obtained in the Example 1 was added into a glass tube reactor having a dimension of 3 cm width and 15 cm length and having a porous gas injection inlet at the lower part. After the installation of a thermometer and stirrer, the glass tube reactor was placed in a microwave oven having a capacity of 1000 W and producing 2.45 GHz frequency of microwave. While injecting nitrogen gas at the rate of about 2.0 L/min and prepolymer particles were stirred at 20 rpm, the reactor temperature was raised from room temperature to 220° C. for over 15 min by applying microwave radiation and the solid state polymerization was performed for 2 hrs. The viscosity average molecular weight of prepared polycarbonate after solid state polymerization was 14,000 g/mole.

EXAMPLE 3

Solid State Polymerization Using Microwave Under 1 Torr Vacuum 5 g of crystalline polycarbonate prepolymer particles obtained in the Example 1 was added into a glass tube reactor which is same as that of Example 2. After the installation of a thermometer and stirrer, the glass tube reactor was placed into a microwave oven which was same as Example 1.

The vacuum was applied to reduce the reactor pressure as vacuum of 1 torr while stirring the prepolymer particles at 20 rpm and injecting nitrogen gas at the rate of 0.2 L/min. Then, microwave was applied to raise the reactor temperature from room temperature to 220° C. However, the solid state polymerization could not be performed due to the formation of plasma flame.

EXAMPLE 4

Solid State Polymerization Using Microwave Under 0.6 Torr Vacuum 5 g of crystalline polycarbonate prepolymer particles obtained in the Example 1 was added into a 200 cc rotary evaporator. After eliminating moisture and oxygen inside of the rotary evaporator by alternatively applying vacuum and a nitrogen gas three times, respectively, the internal pressure of the reactor was reduced to 0.6 torr vacuum by using a vacuum pump. While maintaining the vacuum at the same level, rotary evaporator was inserted into an oil bath kept at 180° C. and the reactor temperature was gradually raised to 220° C. for over 1 hr. Then, the solid state polymerization was performed at 220° C. for 2 hrs under vacuum of below 1 torr. The viscosity average molecular weight of thus prepared polycarbonate was 20,500 g/mole.

The viscosity average molecular weights and the appearances of processed samples of polycarbonate prepared according to Examples 1–4 are shown in the following table 1.

TABLE 1

Physical Properties of Polycarbonates according to the Conditions of Solid state Polymerization

| Examples | Conditions of Solid state Polymerization | Viscosity Average Molecular Weight | Appearance |
| --- | --- | --- | --- |
| Example 1 | Microwave (Vacuum: 60 torr) | 26,500 | Colorless & Transparent |
| Example 2 | Microwave (No Vacuum: 760 torr) | 14,000 | Colorless & Transparent |
| Example 3 | Microwave (High Vacuum: 1 torr) | Polymerization Impossble | — |
| Example 4 | External Heating (High Vacuum: 0.6 torr) | 20,500 | Colorless & Transparent |

According to the table 1, simultaneous usage of microwave radiation and moderate vacuum (60 torr) was the most preferable condition for solid state polymerization because the product has larger average molecular weight and colorless and transparent appearance. While when the solid state polymerization performed by using microwave under vacuum of 1 torr, the reaction was not occurred due to the formation of plasma flame. When the solid state polymerization was performed by conventional methods, the viscosity average molecular weight of polycarbonates were generally very low and this appears to be due to the lower reaction rate resulted from insufficient and not uniform heat transfer.

EXAMPLE 5

Comparison of Physical Properties of Polycarbonates According to the Viscosity Average Molecular Weight of Polycarbonate Prepolymers Polycarbonate prepolymer was prepared in the same manner as Example 1 except the reaction time was 30 min instead of 2 hrs. The viscosity average molecular weight of polycarbonate prepolymers prepared in (a) step 1 was 3,600 g/mole respectively. After the solid state polymerization, the viscosity average molecular weight and appearance of the prepared polycarbonate were summarized in Table 2.

EXAMPLE 6

Comparison of Physical Properties of Polycarbonates According to the Viscosity Average Molecular Weight of Polycarbonate Prepolymers Polycarbonate prepolymer was prepared in the same manner as Example 1 except the reaction time was 4 hrs and 30 min instead of 2 hrs. The viscosity average molecular weight of polycarbonate prepolymers prepared in (a) step 1 was 20,500 g/mole respectively. After the solid state polymerization, the viscosity average molecular weight and appearance of prepared polycarbonate were summarized in Table 2.

TABLE 2

Physical properties of polycarbonates according to the viscosity average molecular weight of polycarbonate prepolymers

| Bisphenol A/ diphenyl- carbonate | Viscosity average molecular weight (g/mole) | | Appearance | Remark |
|---|---|---|---|---|
| | Prepolymer | Polycarbonate | | |
| 1:1.06 (Exam. 1) | 10,500 | 26,500 | Colorless & Transparent | — |
| 1:1.06 (Exam. 5) | 3,600 | 16,500 | A little yellowish | Melt adhesion occur |
| 1:1.06 (Exam. 6) | 20,500 | — | — | Hard to crash |

As shown in table 2, physical properties of the polycarbonates varied with viscosity average molecular weight of polycarbonate prepolymers. Especially, when viscosity average molecular weight of polycarbonate prepolymers was in the range of 4,000–18,000, the prepared polycarbonates had high molecular weight and clear color. When the viscosity average molecular weight of polycarbonate prepolymer was lower than 4,000, it is less preferable because the viscosity average molecular weight of the polycarbonate was not increased enough in 2 hrs of polymerization reaction. Moreover, there was a problem of melt adhesion in the solid state polymerization due to the micro-crushed polycarbonate prepolymers generated in the process of preparing particles. In contrast, when the viscosity average molecular weight of polycarbonate prepolymers was higher than 18,000, it became difficult to crush them into small particles of size below 710 μm using a crusher.

EXAMPLE 7

Comparison of Physical Properties of Polycarbonates According to Crystallinity 100 g of polycarbonate prepolymer prepared in the step (a) step 1 of Example 1 was added into a beaker filled with 500 ml of acetone and stirred at 1000 rpm for 5 min instead of 1 hr. Then the prepolymer particle was filtered and dried at room temperature for 12 hrs. The estimated crystallinity of prepolymer was 3% respectively. Solid state polymerization was performed using 30 g of prepared polycarbonate prepolymer in the same manner as example 1. After the solid state polymerization, the viscosity average molecular weight of polycarbonate was 22,000 g/mole respectively.

EXAMPLE 8

Comparison of Physical Properties of Polycarbonates According to Crystallinity 100 g of polycarbonate prepolymer prepared in the step (a) step 1 of Example 1 was added into a beaker filled with 500 ml of acetone and stirred at 1000 rpm for 3 hrs instead of 1 hr. Then the prepolymer particle was filtered and dried at room temperature for 12 hrs. The estimated crystallinity of prepolymer was 55% respectively. Solid state polymerization were performed using 30 g of prepared polycarbonate prepolymer in the same manner as example 1. After the solid state polymerization, the viscosity average molecular weight of polycarbonate was 19,500 g/mole respectively.

After the solid state polymerization, the viscosity average molecular weights and appearances of prepared polycarbonates were summarized in Table 3.

TABLE 3

Physical Properties of Polycarbonates according to the Crystallinity of Polycarbonate prepolymers

| Crystallinity | Polycarbonates | | |
|---|---|---|---|
| Prepolymers of (%) | Viscosity Average Molecular Weight | Appearance | Remark |
| 21 (Exam. 1) | 26,500 | Colorless & transparent | — |
| 3 (Exam. 7) | 22,000 | Transparent | Melt Adhesion Occurred |
| 55 (Exam. 8) | 19,500 | A little opaque | — |

As shown in Table 3, it indicated that physical properties of the polycarbonates varies with degrees of crystallinity of polycarbonate prepolymers. Especially, when crystallinity of polycarbonate prepolymers was in the range of 5–50%, the prepared polycarbonates had high molecular weight and clear color. When the crystallinity of polycarbonate prepolymers was too low below 5%, the problem of melt adhesion became serious and was not preferable for solid state polymerization. In case the crystallinity of polycarbonate prepolymers was higher than 50%, the proportion for the amorphous part, wherein the polymerization occurs, was limited and the increase of molecular weight is limited.

The following Examples 9 to 11 are for the preparation of polycarbonate prepolymers having appropriate viscosity average molecular weight and crystallinity by the interfacial polymerization and further solid state polymerization using microwave radiation to produce polycarbonates having high molecular weight.

EXAMPLE 9

(a) Step 1

13.5 wt. % of Bisphenol A was prepared by reacting 1 mole of bisphenol A with 5.6 wt. % of aqueous sodium hydroxide solution. The resultant solution and 1.2 mole of phosgene solution in methylene chloride were placed in a tubular reactor which was cooled in an ice-bath over 30 min and further reacted for 30 min while stirring to produce polycarbonate prepolymer by the interfacial polymerization. The reaction mixture was transferred to 2 L of 3-necked reactor and aqueous solution containing 0.005 mole of phenol salt and 0.1 mL of 15% aqueous triethylamine solution were added thereto. The reaction mixture was stirred with a rate of 300 rpm for 30 min. After transferring 200 mL of methylene chloride layer containing polycarbonate prepolymer to 1 L of 3-necked flask, 60 mL of aqueous sodium hydroxide solution and 0.01 mL of aqueous triethylamine solution were added and stirred with a rate of 500 rpm for 30 min. After the reaction, the reaction mixture was washed with sequentially sodium hydroxide, hydrogen chloride solution and water and polycarbonate prepolymer was obtained. The viscosity average molecular weight of the prepared polycarbonate prepolymer was 5,400 g/mole and the molar ratio of end groups Ph/OH was 27/73.

(b) Step 2

100 mL of the polycarbonate prepolymer prepared in the above step 1 was added into 500 mL of acetone/water (50/50, v/v) and then stirred 2 hrs and precipitated. The prepolymer precipitates were filtered and dried at room temperature for 12 hrs. The crystallinity(%) of crystallized prepolymer particle was estimated by measuring the heat of melting peak by DSC(Differential Scanning Calorimetry) and comparing it with the reference data, which is the heat of melting (134 J/g) for 100% crystalline polycarbonate reported in the references (K. Varadarajan et al., *J. of Polymer Science Physics Ed.* Vol 20, p 141~154, 1982). The estimated crystallinity of crystallized polycarbonate particles was 28%.

(c) Step 3

30 g of the polycarbonate prepolymer particles prepared in the above step (b) was added into a 250 mL erlenmeyer flask wherein a porous plate is attached to its lower part for gas injection. After installation of a thermometer and a stirrer, and a vacuum line, the flask was placed in a microwave oven which generates the microwave radiation of frequency 2.45 GHz. The heat capacity of the microwave oven was 1,000 watts. The vacuum was applied to maintain the reactor pressure as vacuum of 60 torr while prepolymer particles were stirred at 20 rpm and nitrogen gas was injected at the rate of about 0.2 L/min. Then, the reactor temperature was raised from room temperature to 220° C. for more than 15 min by applying microwave. And the solid state polymerization was performed for 6 hrs under the same condition. The viscosity average molecular weight of prepared polycarbonate was 22,600 g/mole, and the appearance of sheet pressed with a presser at 240° C. was colorless and transparent.

EXAMPLE 10

Polycarbonate was prepared according to (a) step 1, (b) step 2 and (c) step 3 of Example 7 except that 0.01 mole of phenol salt was used in (a) step 1 and the viscosity average molecular weight of the prepared polycarbonate prepolymer was 4,800 g/mole and the molar ratio of end groups Ph/OH was 52/48. The solid state polymerization was performed for 10 hr in (c) step 3 and the viscosity average molecular weight of prepared polycarbonate was 34,500 g/mole, and the appearance of sheet pressed with a presser at 240° C. was colorless and transparent.

EXAMPLE 11

Polycarbonate was prepared according to (a) step 1, (b) step 2 and (c) step 3 of Example 7 except that crystallized polycarbonate prepolymer particles were pressed into sheets and crushed again into porous pellets having a size of 1–3 mm before solid state polymerization. The viscosity average molecular weight of prepared polycarbonate after solid state polymerization was 16,600 g/mole, and the appearance of sheet pressed with a presser at 240° C. was colorless and transparent.

As described above, the present invention provides a method to produce high quality polycarbonates having high molecular weights within reduced time by using microwave radiation of frequency from 900 MHz to 2.45 GHz as a heat source. The present invention is expected to have a wide range of applications in industry because of improved solid state polymerization rate and simplification of the external heating equipment.

What is claimed is:

1. A process of preparing polycarbonates using microwave which comprises:
    a) preparing polycarbonate prepolymer having a viscosity average molecular weight of 4,000–18,000 g/mole;
    b) converting said polycarbonate prepolymers into crystalline particles having 5–50% of crystallinity; and
    c) producing polycarbonates by solid state polymerization of said crystalline polycarbonate prepolymer particles by using microwave radiation.

2. The process of preparing polycarbonates using microwave according to claim 1, wherein said polycarbonate prepolymer prepared in the step a) contains both phenyl groups and hydroxyl groups at the terminal ends with the molar ratio of a phenyl group/a hydroxyl group(Ph/OH) ranging from 10/90 to 90/10.

3. The process of preparing polycarbonates using microwave according to claim 1 or claim 2, wherein said polycarbonate prepolymer in the step a) is prepared by a melt polymerization of aromatic dihydroxy compound and diarycarbonate.

4. The process of preparing polycarbonates using microwave according to claim 1 or claim 2, wherein said polycarbonate prepolymer in the step a) is prepared by an interfacial polymerization of aromatic dihydroxy compound and phosgene.

5. The process of preparing polycarbonates using microwave according to claim 1, wherein said solid state polymerization in step c) is performed under vacuum, or an inert gas stream, or an inert gas stream under vacuum.

6. The process of preparing polycarbonates using microwave according to claim 5, wherein said inert gas is a single or a mixed gas selected from the group consisting of nitrogen gas, helium gas and argon gas.

7. The process of preparing polycarbonates using microwave according to claim 1, wherein said solid state polymerization in step c) is performed under pressure ranging from 5 torr to atmospheric pressure.

8. The process of preparing polycarbonates using microwave according to claim 1, wherein said solid state polymerization in step c) is performed at a temperature ranging from 180° C. to 250° C.

9. The process of preparing polycarbonates using microwave according to claim 1, wherein said solid state polymerization in step c) is performed using microwave radiation of frequencies ranging from 900 MHz to 2.45 GHz.

10. The process of preparing polycarbonates using microwave according to claim 1, wherein said crystalline particles in step c) is agglomerate into porous pellets before solid state polymerization.

* * * * *